Figure 4:
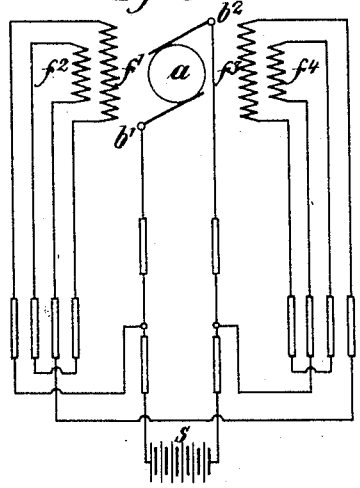

Dec. 4, 1923. 1,476,322
A. BARENYI ET AL
ELECTRIC STARTER FOR INTERNAL COMBUSTION ENGINES
Filed Nov. 28, 1922 9 Sheets-Sheet 1
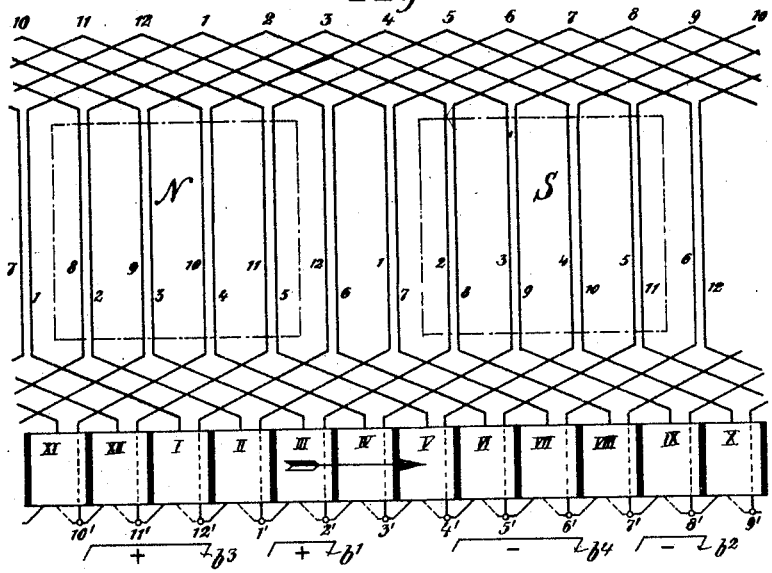
Fig.1.
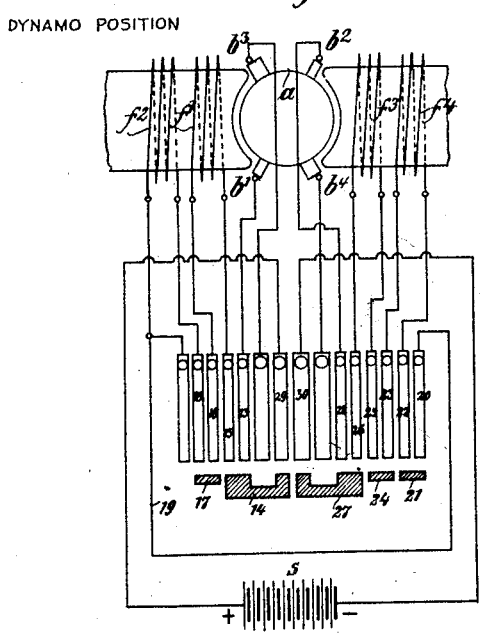
Fig.2. DYNAMO POSITION
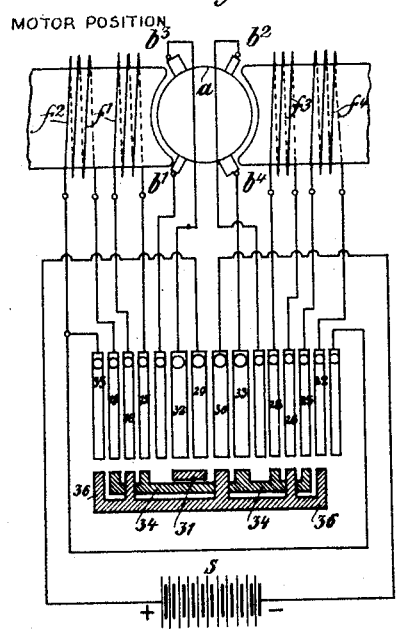
Fig.3. MOTOR POSITION
Arpád Barényi and
Paul Kaemmerer, inventors
by Christy and Christy
their attorneys

DYNAMO POSITION

MOTOR POSITION

Árpád Barényi and
Paul Kaemmerer, inventors
by Christy and Christy
their attorneys Dec. 4, 1923.  
A. BARÉNYI ET AL  
1,476,322  
ELECTRIC STARTER FOR INTERNAL COMBUSTION ENGINES  
Filed Nov. 28, 1922   9 Sheets-Sheet 3

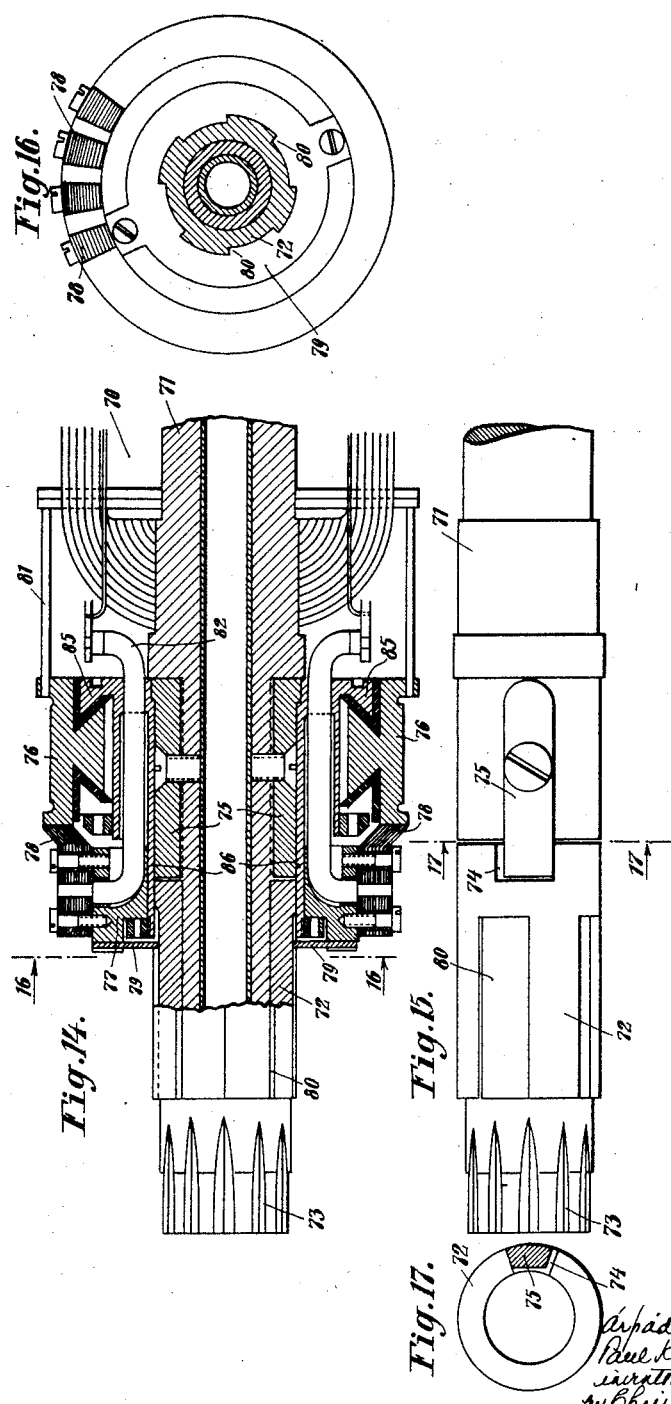

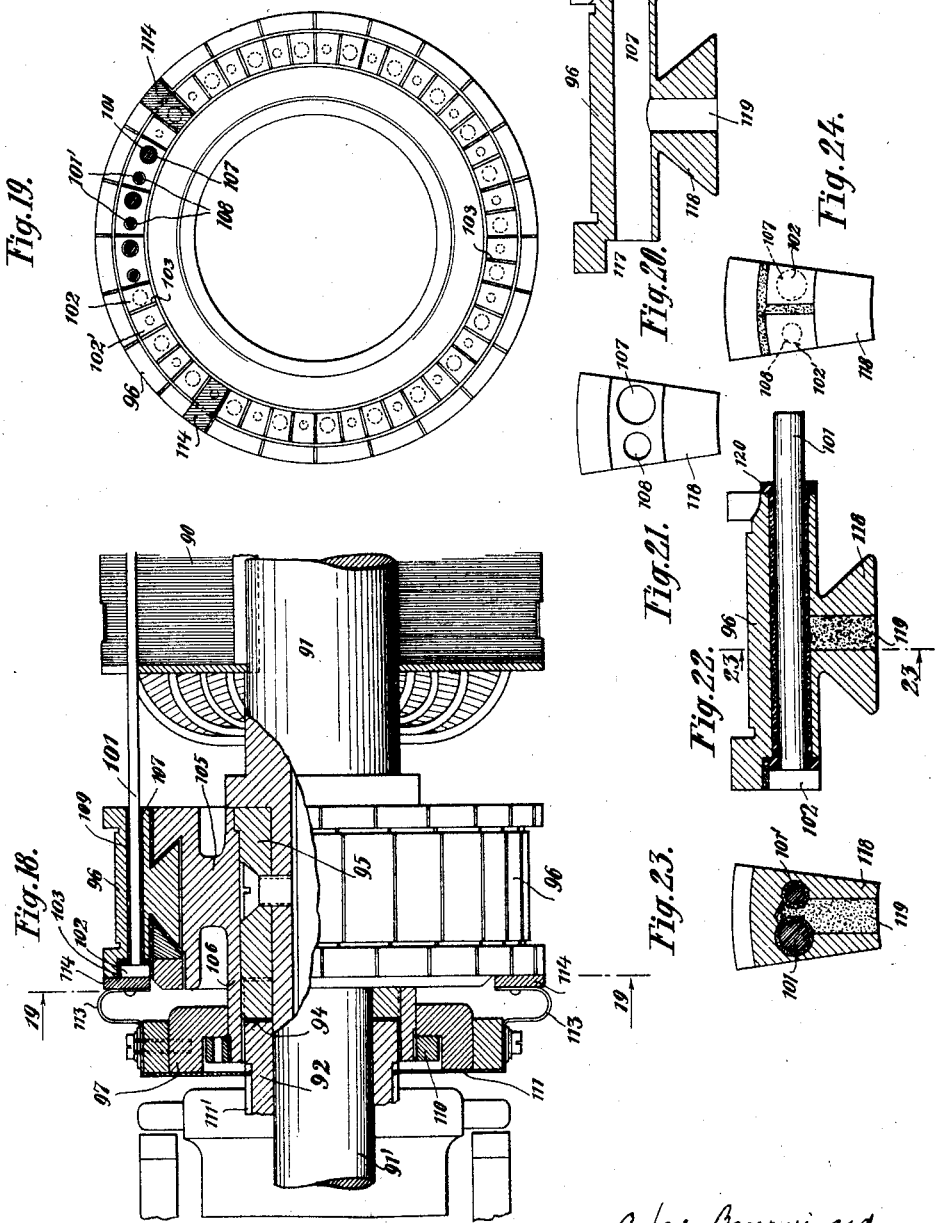

Dec. 4, 1923.　　　　　　　　　　　　　　　　　　　1,476,322
A. BARÉNYI ET AL
ELECTRIC STARTER FOR INTERNAL COMBUSTION ENGINES
Filed Nov. 28, 1922　　　9 Sheets-Sheet 7

Árpád Barényi and
Paul Kaemmerer, inventors
by Christy and Christy
their attorneys Dec. 4, 1923.   1,476,322
A. BARÉNYI ET AL
ELECTRIC STARTER FOR INTERNAL COMBUSTION ENGINES
Filed Nov. 28, 1922   9 Sheets-Sheet 8

Árpád Barényi and
Paul Kaemmerer, inventors
by Christy and Christy
their attorneys

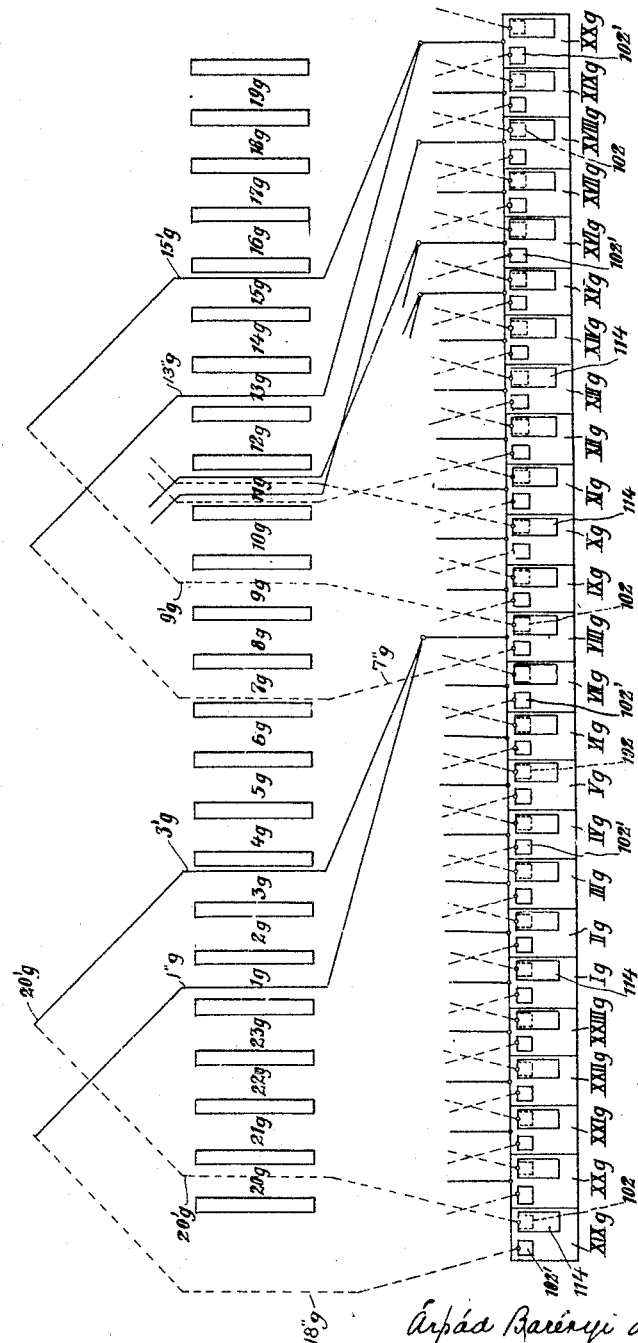

Patented Dec. 4, 1923.

1,476,322

UNITED STATES PATENT OFFICE.

ÁRPÁD BARÉNYI, OF BERLIN-LICHTERFELDE, AND PAUL KAEMMERER, OF CHARLOTTENBURG, GERMANY.

ELECTRIC STARTER FOR INTERNAL-COMBUSTION ENGINES.

Application filed November 23, 1922. Serial No. 603,764.

*To all whom it may concern:*

Be it known that we, ÁRPÁD BARÉNYI, a citizen of Germany, residing at Berlin-Lichterfelde, in the State of Prussia, Germany, and PAUL KAEMMERER, a citizen of Germany, residing at Charlottenburg, in the State of Prussia, Germany, have invented certain new and useful Improvements in Electric Starters for Internal-Combustion Engines; and we do hereby declare the following to be a full, clear, and exact description of the invention, such as will enable others skilled in the art to which it appertains to make and use the same.

Our invention relates to improvements in electric starters for internal combustion engines, and more particularly in starters of the type comprising a motor-dynamo adapted to be driven by the engine in the normal operation thereof for supplying electric energy to the lighting system, charging a battery and other purposes, and to be operated by current from the battery for starting the engine. The object of the improvements is to provide a system of this type in which the dynamo comprises a single commutator and a single armature winding divided into sectional windings or coils adapted to be connected to the lamellæ of the commutator so as to present a high or low resistance for operation of the machine either as a dynamo or as a motor.

For the purpose of explaining the invention several examples embodying the same have been shown in the accompanying drawings, in which the same reference characters have been used in all the views to indicate corresponding parts. In said drawings,—

Fig. 1, is a diagram illustrating the armature winding, the commutator, and the manner of connecting the sectional coils of the winding to the lamellæ of the commutator.

Figure 5:
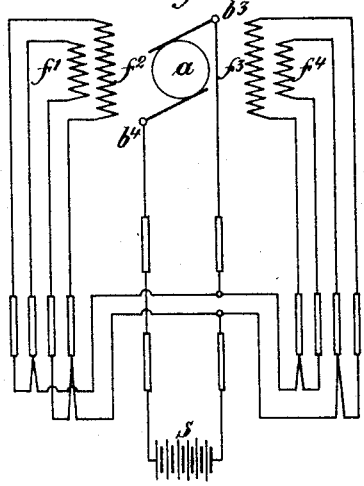
Figure 6:
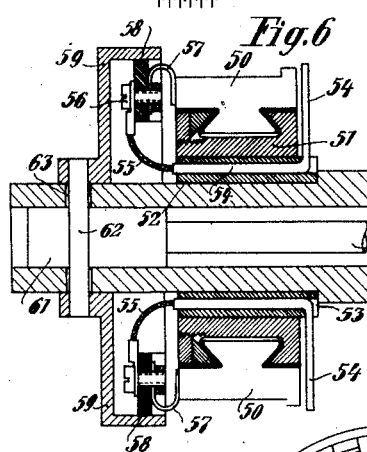
Figure 7:
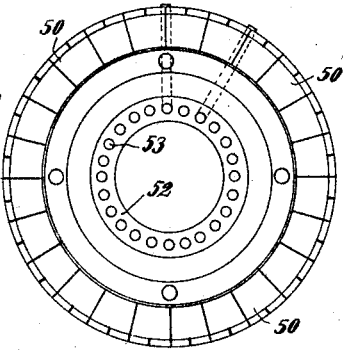
Figure 8:
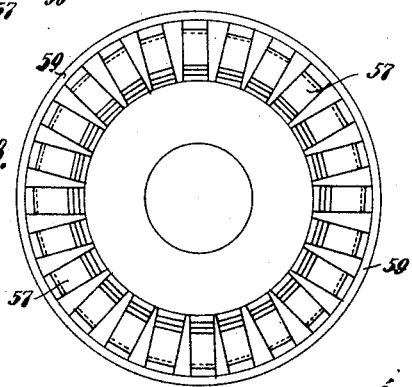
Figure 9:
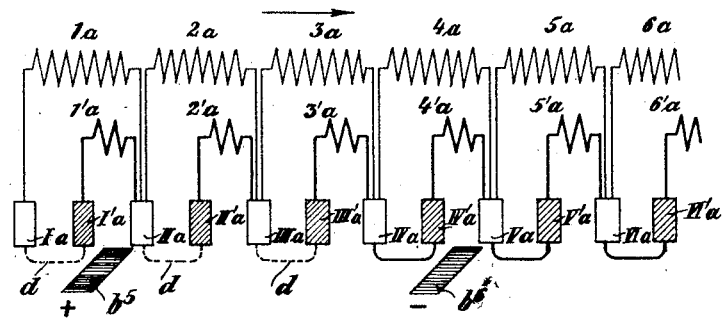

Fig. 2, is a diagrammatic view of a system connected for generating current, said system comprising the armature winding shown in Fig. 1 and a field winding made in sections, Fig. 3, is a similar view of the system shown in Fig. 2 connected for starting the engine, Fig. 4, is a diagram showing the electrical connection of the system shown in Figs. 2 and 3 when charging the battery, Fig. 5, is a similar diagram showing the system as connected for operating as a motor, Fig. 6, is a longitudinal section of the commutator, Fig. 7, is an end view of the commutator seen from the right in Fig. 6, Fig. 8, is an end view of a switch ring cooperating with the lamellæ of the commutator for connecting the coils of the armature winding in different ways, Fig. 9, is a diagrammatic view showing a modification of the armature winding and commutator, said winding comprising a main section and a subsidiary section embedded in the grooves of the armature provided for the main section, Figs. 10–13 are diagrams showing further modifications, Fig. 14, is a partial longitudinal section of an armature embodying the invention, Fig. 15, is a detail view showing in elevation the armature shaft, Fig. 16, is a cross section taken on the line 16—16 of Fig. 14, Fig. 17, is a cross-section taken on the line 17—17 of Fig. 15, Fig. 18 is a longitudinal section similar to that shown in Fig. 14 and showing a modification of the construction of the commutator, Fig. 19, is an end view of the commutator illustrated in Fig. 18 partly in section and looking in the direction of the arrows 19—19.

Figure 11:
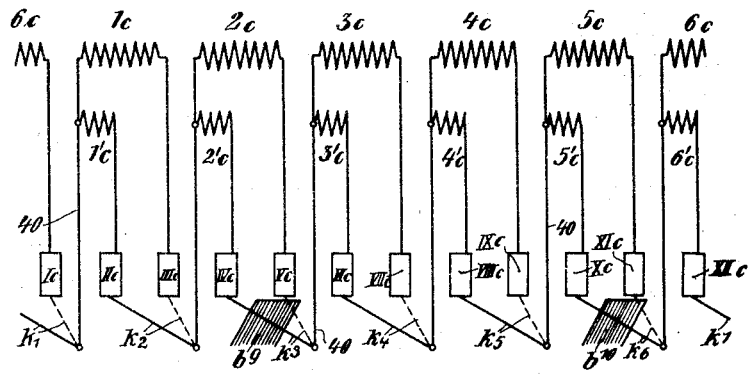
Figure 25:
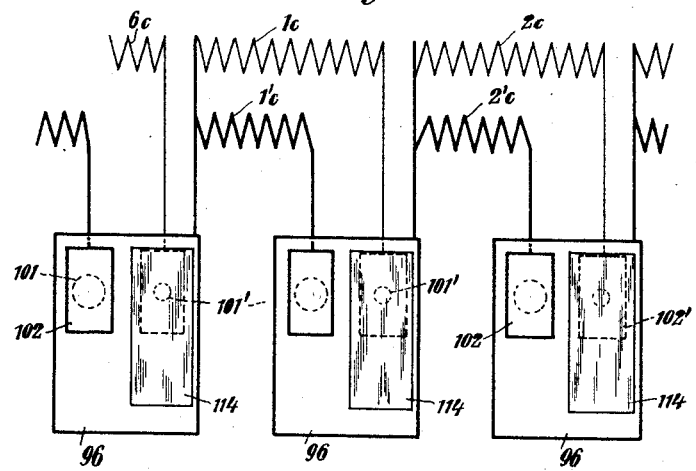
Figure 26:
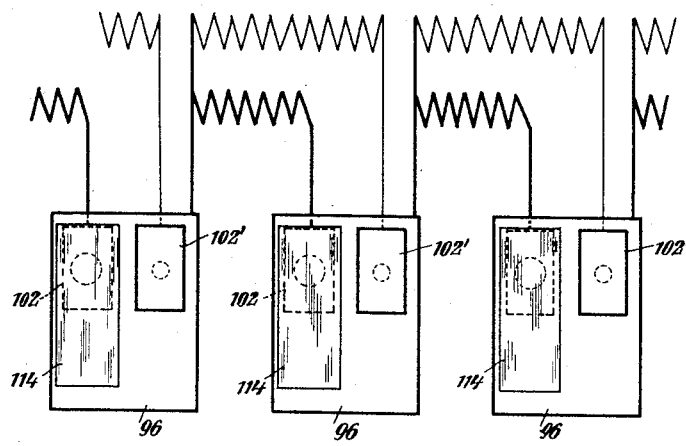
Figure 27:
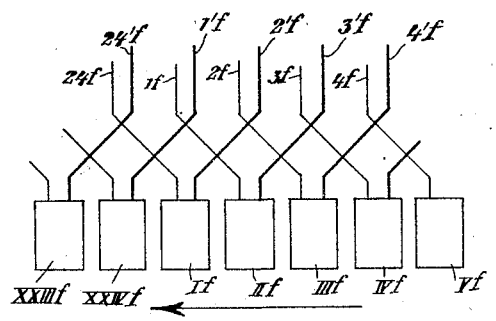
Figure 28:
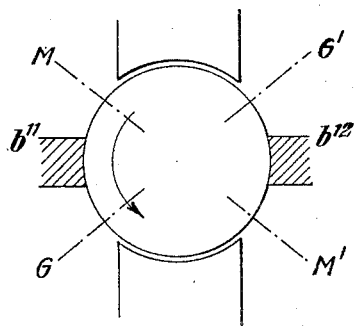

Fig. 20, is a detail sectional view on an enlarged scale showing one of the lamellæ provided in the commutator illustrated in Figs. 18 and 19, Fig. 21, is an end view of Fig. 20, Fig. 22, is a sectional view similar to that shown in Fig. 20 and illustrating a lamella with the ends of two armature coils embedded therein, Fig. 23, is a cross-section taken on the line 23—23 of Fig. 22, Fig. 24, is an end view of the lamella looking from the left in Fig. 22, Figs. 25 and 26, are diagrams showing a system corresponding to the one illustrated in Fig. 11 and equipped with switching means similar to those shown in Figs. 18 to 24, Fig. 27, is a diagram showing a modification of the system, Fig. 28, is a diagrammatical view of a dynamo equipped with the system shown in Fig. 27, and Fig. 29, shows a system similar to that shown in Figs. 25 and 26 and embodying the connection of the coils illustrated in Figs. 26 and 27.

In the example shown in Fig. 1 the armature winding comprises twelve coils indicated by the characters 1 to 12, all of the said coils consisting of wires of equal cross-sections connected in the usual way to the lamellæ of the commutator indicated by the characters I, II . . . and XII. As distinguished from constructions now in use each coil is connected only with one of its ends to a lamella, the opposite end being connected to a switch member adapted to connect the same either to the lamella adjacent to the said lamella connected with the other end of the coil or with one of the succeeding lamellæ. When connecting the ends of the coils respectively to adjacent lamellæ the current flows successively through all the coils connected in series, that is from lamella I over coil 1, to lamella II, from lamella II over coil 2 to lamella III, etc. Therefore all the coils are connected in series for generating electric energy. When setting the switch for connecting the free end of each coil with one of the succeeding lamellæ, for example for connecting coil 1 to lamella III, the end of coil 2 to lamella IV, the end of coil 3 to lamella V, etc., and providing broad brushes adapted to bridge adjacent lamellæ, pairs of adjacent coils are connected in shunt, and the current supplied through the brushes is divided for flowing through pairs of coils connected in shunt, said pairs of coils being in series one with another and corresponding in operation to single coils the wires of which have the double cross-sections and a reduced resistance. In Fig. 1 we have indicated the free ends of the coils by the characters $1'$, $2'$, $3'$, etc. The connections of the said ends to the lamellæ corresponding to the series connection of all the coils and to the operation of the system as a generator have been indicated in dotted lines, and the connections corresponding to the shunt connection of pairs of coils and to the operation of the system as a motor have been indicated by full lines. The brushes $b^1$, $b^2$ for the operation of the machine as a generator, and the brushes $b^3$, $b^4$ the breadth of which is the double of that of the brushes $b^1$, $b^2$, and which are operative when running the machine as a motor, are shown in Fig. 1 below the commutator. We wish it to be understood that our invention is not limited to the construction shown herein in which only two coils are adapted to be connected in shunt, the number of the coils adapted to be connected in shunt depending upon the desired total cross-section and the resistance of the wires connected in shunt.

If it is desired to provide for a variation of the resistance of the field winding in addition to the variation of the resistance of the armature winding, the field winding may also be divided into two or more coils adapted to be connected in series or in shunt. A system of this kind has been illustrated in Figs. 2 and 3, Fig. 2 showing the coils connected for operation of the system as a generator, and Fig. 3 showing the coils connected for operation as a motor. When operating the system as a generator the brushes $b^1$ and $b^2$ are operative, and the field windings are divided each into two coils $f^1$, $f^2$ and $f^3$, $f^4$. The said coils and the brushes are connected over a switch to a storage battery $s$. The armature circuit is closed over brush $b^1$, contacts 13, 14, 15, field winding $f^1$, contacts 16, 17, 18, field winding $f^2$, lead 19, contacts 20, 21, 22, field winding $f^4$, contacts 23, 24, 25, field winding $f^3$, contacts 26, 27, 28, and brush $b^2$. The contacts 14 and 27 are connected over contacts 29 and 30 with the battery $s$, whereby the battery is connected in series with the field winding. Therefore, the windings of the system are connected as follows referring to Fig. 4: All the field coils $f^1$, $f^2$, $f^3$, and $f^4$ are connected in series with the battery, and they are connected in shunt to the armature winding.

When starting the engine and operating the dynamo-electric machine as a motor the connections are made in the manner shown in Fig. 3. Instead of the narrow brushes $b^1$, $b^2$ the broad brushes $b^3$, $b^4$ are in engagement with the commutator, which brushes bridge pairs of adjacent lamellæ of the commutator. Now the following circuit is closed: from battery $s$ over contacts 29, 31, and 32, brush $b^3$, armature winding $a$, and brush $b^4$. In the armature winding pairs of adjacent coils are connected in shunt, as has been described with reference to Fig. 1. From brush $b^4$ the circuit may be traced over contact 33 and contact rail 34 connected with the contacts 15 and 18 of the field coils $f^1$ and $f^2$ and the contacts 25, 28 of the field coils $f^3$ and $f^4$. The opposite ends of the field coils are connected over contacts 16, 35 and 22, 26 with a contact rail 36, which is also in connection with contact 30 from which the circuit passes to the terminal of the battery. Therefore the following connections are made, referring to Fig. 5: Field coil $f^1$ is connected in shunt with field coil $f^2$, and field coil $f^3$ with field coil $f^4$, and also the field coils $f^1$, $f^2$ and $f^3$, $f^4$ are in shunt connection. Both combined fields are connected in series with the armature winding $a$.

In Figs. 6 to 8 means have been shown for connecting the free ends of the armature coils to the lamellæ of the commutator. The lamellæ 50 are insulated and mounted on a hub 51, as is known in the art. The hub is disposed on a ring 52 having axial bores 53 one for each of the lamellæ, and the ends 54 of the armature coils are passed through the said bores, and they are connected by flexible conductors 55 and screws 56 to contact springs 57 bearing with their free ends on the end faces of the lamellæ. The number of the springs is equal to that of the lamellæ 50, and they are secured to a ring 58 of insulating material mounted within a drum 59 adapted to be turned relatively to the commutator 50. For turning the drum a shaft 61 connected therewith by a bolt 62 is rotatably mounted within the hollow shaft 60, the bolt passing through circumferential slots 63 of the shaft 60.

For generating electric current each spring 57 bears on the end face of the lamella which directly follows the lamella connected with the opposite end of the coil. For starting the engine the drum 59 is turned in a direction for advancing the springs through a distance corresponding to two consecutive lamellæ, and simultaneously the broad brushes are thrown into engagement with the commutator. The particular mounting of the brushes forms no part of our invention and can be readily provided by one familar with dynamo construction. By turning the drum backwards the system is again set into position for generating current.

In the system shown in Fig. 9 the armature is provided with the usual winding the coils $1^a$, $2^a$, $3^a$ etc. of which are connected in series over commutator lamellæ $I^a$, $II^a$, $III^a$, etc. The winding is such that it is adapted to build up the pressure required for generating the desired current. In the grooves of the said winding a second winding is embedded, and each of the coils $1'^a$, $2'^a$, $3'^a$, etc. of the second winding is connected with one end to the lamellæ of the main winding, and with the opposite end to subsidiary lamellæ $I'^a$, $II'^a$, $III'^a$, etc. disposed between the lamellæ $I^a$, $II^a$, $III^a$ etc. By means of a rotary switch or the like having terminals $d$ adjacent lamellæ $I^a$, $I'^a$, $II^a$, $II'^a$, $III^a$, $III'^a$, etc. can be connected with each other for short-circuiting the said lamellæ and connecting the coils $1^a$, $1'^a$, $2^a$, $2'^a$, etc. in shunt. It will be understood that the main and subsidiary windings are connected to a common commutator having a single pair of brushes $b^5$ and $b^6$.

When starting the engine the terminals $d$ are at first open, and the current passes through the main armature winding $1^a$, $2^a$, etc. for imparting rotary movement to the armature, which movement is used for bringing the terminals $d$ in contact with the subsidiary lamellæ and connecting the subsidiary coils $1'^a$, $2'^a$, etc. in shunt with the corresponding coils of the main winding. Thereby the effective cross-section of the armature winding, the intensity of the current flowing therethrough, and the starting torque are increased. After starting the engine the subsidiary winding $1'^a$, $2'^a$, etc. is switched out at the terminals $d$, so that only the main winding is operative for generating current. The mechanism provided for operating the armature and the commutator will be described hereinafter with reference to Figs. 14 to 17.

Figure 10:
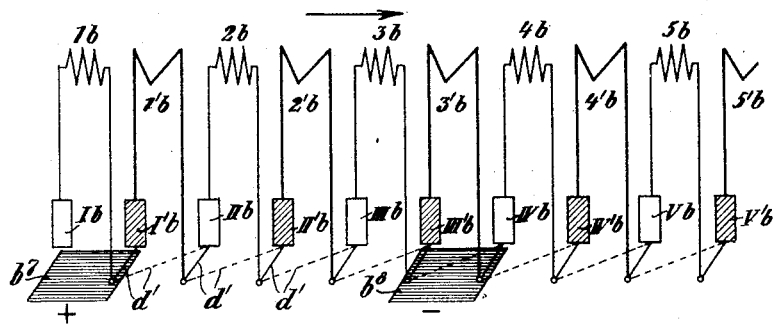

In the modification shown in Fig. 10 the coils of the main and subsidiary windings are disposed in separate alternating grooves of the armature, and each coil is secured with one end only to a lamella of the commutator. The coils $1^b$, $2^b$, etc., are connected with the lamellæ $I^b$, $II^b$, etc., and the intermediate subsidiary coils $1'^b$, $2'^b$, etc., with the lamellæ $I'^b$, $II'^b$, etc., located between the lamellæ $I^b$, $II^b$, etc. The free ends of all the coils are connected to contacts $d'$ adapted to connect the free ends of the main coils $1^b$, $2^b$, etc., either with the adjacent lamellæ $I'^b$, $II'^b$, etc., of the subsidiary coils, as is shown in Fig. 10 by full lines, or, as is shown in said figure in dotted lines, with the succeeding lamellæ $I^b$, $II^b$, etc., of the main coils. The brushes $b^7$ and $b^8$ are so broad that they are always in contact with two adjacent lamellæ.

For starting the engine the contacts $d'$ are set so as to make the connections shown in Fig. 10 in dotted lines. The brushes $b^7$, $b^8$ connect the subsidiary lamellæ $I'^b$, $II'^b$, etc., with the main lamellæ $I^b$, $II^b$, etc., so that the main and subsidiary coils are connected in shunt. Therefore the total cross-sections of the effective windings, the current flowing therethrough, and the torque produced thereby are large. For generating current the contacts $d'$ are connected to lamellæ $I'^b$, $II'^b$, etc., adjacent to the lamellæ $I^b$, $II^b$, etc., as is shown in Fig. 10 in full lines, so that all the coils, and more particularly the main and subsidiary coils $1^b$, $1'^b$, etc., are connected in series.

While in the example shown in Fig. 9 the subsidiary winding is inoperative when generating current, in the modification shown in Fig. 10 both windings are operative for both status of the system, said windings being connected in shunt when starting the engine, and in series when generating electric energy.

In the example shown in Fig. 11 the armature windings consist each of two sectional coils $1^c$, $1'^c$, $2^c$, $2'^c$, $3^c$, $3'^c$, etc., the coils $1^c$, $2^c$, $3^c$ etc., having a high resistance and the coils $1'^c$, $2'^c$, etc., a lower resistance. The cooperating sectional coils are connected by common wires 40 with switch members such as contact springs $k_1$, $k_2$, $k_3$, etc., making contact with the commutator lamellæ and adapted to be shifted for being set on either one of adjacent lamellæ, as is shown in Fig. 11 respectively by full and dotted lines. Therefore contact spring $k_1$ can make contact either with lamellæ XII$^c$ or with lamella I$^c$, contact spring $k_2$ with lamellæ II$^c$ or III$^c$, contact spring $k_3$ with lamellæ IV$^c$ or V$^c$. The ends of the sectional coils are in contact with adjacent lamellæ, the end of the sectional coil $6'^c$ making contact with lamellæ XII$^c$, that of sectional coils $6^c$ with lamellæ I$^c$, that of sectional coil $1'^c$ with lamella II$^c$, that of sectional coil $1^c$ with lamella III$^c$, that of sectional coil $2'^c$ with lamella IV$^c$, that of sectional lamella $2^c$ with lamella V$^c$, that of sectional coil $3'^c$ with lamella VI$^c$, etc.

When operating the machine as a generator the contact springs $k_1$, $k_2$, $k_3$, etc., are in the positions shown in dotted lines, and they connect the common wires 40 with the commutator lamellæ I$^c$, III$^c$, V$^c$, etc. Therefore, the sectional coils $1^c$, $2^c$, $3^c$, etc., are connected in series and they supply energy to the brushes $b^9$, $b^{10}$. For setting the system in position for acting as a motor the contact springs $k_1$, $k_2$, $k_3$, etc., are shifted into engagement with the adjacent lamellæ XII$^c$, II$^c$, IV$^c$, etc., connected with the ends of the sectional coils $6'^c$, $1'^c$, $2'^c$, etc. Thereby the sectional coils $1^c$, $2^c$, $3^c$, etc., are switched out, because the lamellæ I$^c$, III$^c$, V$^c$, are disconnected from the contact springs, and the sectional coils $1'^c$, $2'^c$, $3'^c$, etc., provide a single winding receiving electric current from the battery.

If the switch member carrying the contact springs $k_1$, $k_2$, $k_3$, etc., is automatically controlled in the manner to be described hereafter, the dynamo-electric machine is at first when starting the engine connected for acting as a generator, the contact springs connecting the ends of the coils and the commutator lamellæ in the manner shown in dotted lines. The current supplied to the machine causes rotation of the armature, so that the contact springs pass from the lamellæ engaged thereby to those next succeeding in the direction of the rotation and into the positions shown in Fig. 11 in full lines. Thereby the current is automatically directed from the sectional coils $1^c$, $2^c$, $3^c$, etc. to the sectional coils $1'^c$, $2'^c$, $3'^c$, etc., and a higher torque is developed by the armature, which is sufficient for starting the internal combustion engine. After the internal combustion engine has been started the armature of the motor-dynamo receives power from the engine, and after the engine has built up a certain speed the armature lags behind the switch member connected with the engine until the contact springs are again in engagement with the adjacent lamellæ for connecting the system as a generator. In both status the same set of brushes $b^9$, $b^{10}$ is provided for supplying current to the armature and for collecting the current from the armature and supplying the same to the battery or other consuming system.

Figure 12:
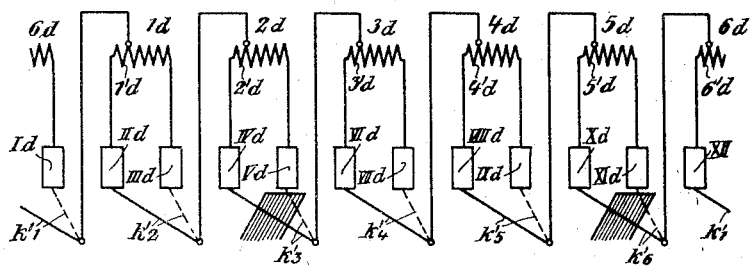

In the modification shown in Fig. 12 the pairs of sectional coils are parts of a combined coil connected with one terminal to a lamella, for example II$^d$, and with the opposite end to the succeeding lamella adjacent thereto, the next coil being connected with one end to the succeeding lamella IV$^d$ and with the opposite end to the lamella V$^d$, etc. The coils are connected at points intermediate their ends with switch arms $k'_1$, $k'_2$, etc., the coils being divided so that sectional coils $1^d$, $1'^d$, $2^d$, $2'^d$ etc. of different resistances are produced. For operating the system as a motor the switch arms $k'_1$, $k'_2$, etc. are set in the positions shown in full lines, and the current supplied from the battery flows through the sectional coils $1'^d$, $2'^d$, etc., and for operating the system as a generator the switch arms are set in the positions shown in dotted lines, and the current flows through the coils $1^d$, $2^d$, $3^d$, etc. of higher resistance and high number of turns.

Figure 13:
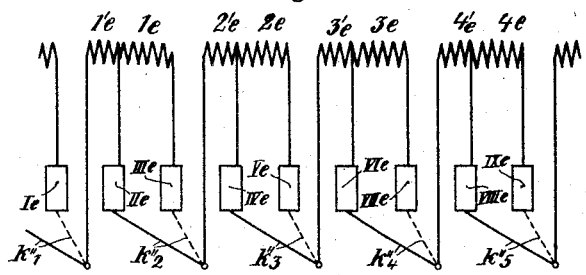

The example shown in Fig. 13 is similar to the one described with reference to Fig. 12, but the construction is such that when operating the system as a motor only one of the sections of each coil is included in the armature circuit, while when operating the system as a generator the whole coil is operative. For this purpose the coils are connected with one of their ends to the switch arms $k''_1$, $k''_2$, etc. and with their opposite ends to commutator lamellæ I$^e$, III$^e$, V$^e$, etc. the intermediate lamellæ II$^e$, IV$^e$, VI$^e$, etc. being connected with the coils at points intermediate the ends thereof. According to the positions of the switch arms $k''_1$, $k''_2$ etc. the current flows either through the sections $1'^e$, $2'^e$, etc. of the coils, or through both sections $1^e$, $1'^e$, $2^e$, $2'^e$ of the coils.

In the examples shown in Figs. 11 to 13 each armature coil is divided by a lead connected with the commutator into sections one of high ohmic resistance and many turns and the other one of low ohmic resistance and few turns.

As has been stated above, the switches for setting the system into position for operation as a motor or generator are automatically operated. We shall now describe a preferred construction of such operating means which may be used with any of the systems described. Our improved construction is similar to the one described with reference to Figs. 6 to 8.

As shown in Figs. 14 to 17, the armature 70 is mounted on a shaft 71 connected with a coaxial shaft 72 formed at its free end with gear teeth 73 forming a part of the transmission gear connected with the engine. At the end adjacent to the shaft 71 the shaft 72 is formed with a pair of diametrically opposite slots 74 engaged by clutch members 75 secured to the shaft 71. As shown the clutch members have a certain play within the slots 74, so that the shafts can be turned relatively to each other through an angle corresponding to the distance of two consecutive commutator lamellæ for connecting one of the ends of each armature coil with either one of two adjacent lamellæ. To the armature shaft 71 a drum 85 is secured which carries commutator lamellæ 76 and a switch ring 77. To the switch ring insulating spring contacts 78 are secured which bear on the end faces of the commutator lamellæ 76. By mounting the ring 77 on the drum 85, and more particularly on an axial tubular extension 86 thereof the contact springs are exactly centered with relation to the lamellæ, and they exert a uniform pressure thereon. The ring is connected with the shaft 72 for being carried along thereby in circumferential direction, by means of a disk 79 secured thereto and formed internally with teeth engaging in corresponding grooves 80 of the shaft 72. For connecting the ends of the armature coils respectively with the lamellæ 76 and with the spring contacts, as has been described above, leads 81 and 82 are provided.

The operation of the commutator shown in Figs. 14 to 17 is as follows: Normally the armature windings are connected for generating electric energy. For starting the engine, current is supplied to the armature from the battery, so that the armature is rotated. At first the switch drum, which is connected with the shaft 72 and the engine. does not take part in such rotation, until the clutch members 75 of the armature get into engagement with the side walls of the slots 74 located in front thereof. By the switch ring thus lagging behind the armature and the commutator, the spring contacts are shifted with relation to the lamellæ, so that the armature is connected for operation as a motor and a high torque is developed thereby. The armature carries along the engine by means of the clutch 74, 75. As the engine becomes self-actuating the armature accelerates the same to its highest speed. Thereafter the armature lags behind the engine, until the clutch 74, 75 and the switch ring 77 are again in the positions shown in Fig. 14, in which the armature acts as a generator receiving power from the engine.

From the foregoing description it will be understood that the operation of the switch ring in both directions is automatic. After starting the engine the armature is not immediately made inoperative, but it accelerates the engine until the highest speed is obtained. Thereby starting is made reliable. Furthermore, it is impossible that the armature when connected as a motor has a braking effect on the engine, because the switch ring 77 is necessarily operated for connecting the armature as a generator, as soon as the armature lags behind the engine and before it can brake the same.

In Figs. 18 and 19 we have shown a modification of the commutator in which the ends of the armature coils are not connected in part to the lamellæ and in part to the switch ring 77, but in which pairs of coils can alternately be connected to the same lamellæ.

The construction of the armature and its shaft is similar to that described with reference to Figs. 14 to 17. As shown the armature 90 is keyed to a shaft 91 having at one end a portion 91' of reduced diameter. On the portion 91' there is a sleeve 92 adapted to be connected with the engine and formed at one end with slots 94 engaged by clutch members 95 secured to the shaft portion 91', which clutch members have a certain play within the slots corresponding to one half of the breadth of the lamellæ and permitting the sleeve 92 and the parts connected therewith to be turned relatively to the shaft 91, 91' through a certain angle. The reduced portion 91' of the armature shaft has a drum 105 keyed thereto, on which insulated commutator lamellæ 96 are mounted in a manner known in the art. The number of the lamellæ is equal to that of the armature grooves each of which has two coils one of large resistance and many turns and the other one of small resistance and few turns embedded therein. The commutator lamellæ 96 are provided each with two longitudinal bores 107 and 108 through which the ends 101 and 101' of the armature coils located in the corresponding armature grooves are passed to the front face of the commutator, insulating material 109 being placed between the said ends and the walls of the bores. The ends of the wires 101 and 101' are connected to metallic contact plates or terminals 102 and 102' respectively, which are embedded in the lamellæ and are insulated relatively to each other and to the lamellæ by insulating material 103. The aggregate breadth of adjacent contact plates 102 and 102' is substantially equal to the breadth of the lamellæ.

In front of the commutator a switch ring 97 is mounted on the drum 105 and more particularly on an axial flange 106 thereof to which it is secured by means of a ring 110 screwed to the flange. To the said switch ring a ring 111 is secured which engages with internal teeth in corresponding grooves of the sleeve 92, the construction being similar to that described with reference to Figs. 14 to 17. Therefore the switch ring is adapted to be turned relatively to the armature shaft 91, the drum 105 and the lamellæ 96 and together with the sleeve 92 through an angle corresponding to one half the breadth of the lamellæ. To the switch ring 97 springs 113 each carrying a contact plate 114 are secured, which plates make contact each with the outer part of the front face of one of the lamellæ and either one of the contact plates 102 or 102' for connecting either one of the coils 101 or 101' with the corresponding lamellæ. Thereby either the high resistance coils or the low resistance coils are connected to the lamellæ.

The operation of the system is similar to that described with reference to Figs. 14 to 17. When supplying electric energy to the system for starting the engine the current is first supplied to the high resistance coils 101'. The sleeve 92 is connected with the engine, and it is not rotated by the first current impulse, while the armature and the commutator are rotated and turned relatively to the switch ring 97 and the contact plates 114 so far that the contact plates 114 make contact with the plates 102 of the low resistance or motor coil, whereupon high torque is developed and the engine is started. As the engine builds up speed the armature lags behind the same, so that the contact plates 114 again make contact with the terminals 102' of the high resistance or generator coil. Now the engine drives the armature which supplies electric energy for charging the battery and other purposes.

The construction shown in Figs. 18 and 19 is preferable as compared to the construction shown in Figs. 14 to 17 for the reason that the number of the lamellæ and therefore the diameter of the commutator are reduced. The reduction of the diameter of the commutator results in a reduction of the circumferential velocity of the commutator and therefore in a reduction of the wear thereof by friction. As both the motor current and the generator current flows alternately through all the lamellæ, the wear of the commutator is uniform all around the circumference, while in the system shown in Figs. 14 to 17 the lamellæ connected with the motor coils are subject to more rapid wear than those connected with the generator coils, which results in sparking and increased wear by sparking.

In Figs. 20 to 24 we have shown a preferred construction of the lamellæ shown in Figs. 18 and 19 and the insulated wires embedded therein, the essential feature of the construction residing in embedding the wire ends or wires connected therewith within the lamellæ 96 by means of plastic insulating media adapted to bind metal, such as porcelain, cement, or the like. Thereby the manufacture is made more easy as compared to insulations consisting of rigid insulating media such as tubular fibre, and the like. In addition the wires are rigidly connected with the lamellæ by the hardened insulating medium, so that their front ends are not projected beyond or retracted from the outer faces of the lamellæ by non-uniform expansion by heat, as is necessary for insuring thorough contact between the contact plates 114 and 102, 102'.

In the example shown in Figs. 20 to 24 the lamella 96 is provided with two longitudinal bores 107 and 108 the bore 107 having a large diameter and the bore 108 a small one. At the front face the lamella is formed with a recess 117 for accommodating the terminals 102 and 102' of the wires 101 and 101'. The foot portion 118 of the lamella is provided with a bore 119 communicating with both bores 107 and 108. In the manufacture of the lamella the bores 107 and 108 and the recess 117 are first filled with a thick plastic insulating medium, whereupon the wires 101 and 101' having the segments 102 and 102' secured thereto are centrally inserted, whereby the wires and the segments are embedded in the plastic insulating medium, and are rigidly held therein after the insulating medium has hardened. It will be understood that when thus inserting the wires the passage 119 is not made use of. In another method the wires 101 and 101' are inserted into the bores 107 and 108 and before filling the same with insulating medium, in which case the wires are centered at their ends by tough or solid insulating bodies 120 formed with small apertures for the escape of the air from the bores when applying the insulating medium thereto. Thereafter a liquid insulating medium is forced into the bores 107 and 108 through the passage 119 and to the opposite ends of the bores, the air escaping through the small apertures provided in the centering members 120. After the insulating medium has hardened the pins or wires 101 and 101' are rigidly secured to the lamella. In assembling the armature the wires or pins 101 and 101' are soldered or otherwise secured to the ends of the armature coils.

A suitable insulating medium consists of water-glass or sodium silicate and porcelain.

It will be understood that any of the switching means shown in Figs. 6 to 8, 14 to 17, and 18 and 19 may be used in any of the armature constructions shown diagrammatically in the accompanying drawings. To show this it will be sufficient to illustrate one of the said armature constructions in connection with one of the switching means. Figs. 25 and 26 show the system illustrated in Fig. 11 in combination with the switching means illustrated in Figs. 18 to 24, and for clearness sake the parts have received the same reference characters as corresponding parts shown in Figs. 11, 18 to 24, so that it is not necessary to repeat the description in detail. In Fig. 25 the contact plates 114 are in the positions for making contact with the terminals 102' of the high resistance coils $1^e$, $2^e$, etc., and the system is connected for operating as a generator. In Fig. 26 the contact plates 114 make contact with the terminals 102 of the low resistance coils, and the system is connected for operating as a motor.

In the systems described in which one commutator and one pair of brushes are provided the armature reaction is different when operating the system as a motor and as a generator, by reason of the difference of the intensity of the currents flowing through the windings and the difference in the number of turns of the windings. Therefore, in order to prevent sparking it is necessary to set the brushes in different ways when starting the engine and charging the battery. The mounting of commutator brushes in such a manner that they can be rotatably shifted to bear on different points of the commutator circumference forms no part of our invention and is not illustrated.

In Figs. 27 and 28 we have shown a system in which shifting of the brushes is not necessary. With this object in view the coils of the motor and generator windings disposed in the same armature grooves are not connected to the lamellæ in the usual way, but they are connected to separate lamellæ disposed at an angle apart which is equal to the relative angle of the neutral zones. Therefore the armature reaction is compensated within the windings, and the commutator brushes can be in fixed positions.

In Figs. 27 and 28 we have shown a portion of an armature provided with 24 lamellæ $I^f$, $II^f$, . . . $XXIV^f$ and 24 armature grooves. In each groove a thick motor winding $1'^f$, $2'^f$ . . . $23'^f$, $24'^f$ and a thin generator winding $1^f$, $2^f$ . . . $23^f$, $24^f$ are embedded. Within the armature groove which is in line with the lamella $I^f$ the windings $1^f$ and $1'^f$ are embedded, but the ends of the said windings are not connected to the lamella $I^f$ but the motor winding $1'^f$ is connected to the adjacent lamella $XXIV^f$ and the generator winding $1^f$ to the lamella $II^f$. In a similar way the windings embedded in the other armature grooves are respectively connected to the lamellæ which are disposed at opposite sides of the lamellæ located in line with the grooves. The angular distance of the lamellæ $XXIV^f$ and $II^f$ corresponds to the angle of the neutral zones of the system operating respectively as a motor and a generator, said zones having been indicated in Fig. 28 by the broken lines M M' and G G'. In the constructions of the systems described with reference to Figs. 1 to 13 the brushes must be disposed along the said lines, and it would be necessary to shift the same when passing from operation of the system as a motor to operation as a generator. In the construction shown in Figs. 27 and 28 the brushes $b^{11}$ and $b^{12}$ are stationary.

The system shown in Figs. 27 and 28 can be used also in armature windings which are not separately used, and more particularly in armatures of any kind the windings of which operate with different ampere-turns.

In Fig. 29 we have shown the system as combined with switching means of the construction shown in Figs. 18 and 19 and windings corresponding to Fig. 11.

The figure shows the development of the armature and its commutator, said armature having twenty-three grooves and said commutator having twenty-three lamellæ indicated respectively by the characters $1^g$, $2^g$, . . . $23^g$ and $I^g$, $II^g$, . . . $XXIII^g$. Within each groove the wires of two coils are embedded one of high resistance and the other one of low resistance, which coils have been indicated by the characters $1'^g$, $2'^g$ . . . and $1''^g$, $2''^g$, . . . respectively. For clearness sake we have shown only one high resistance coil and one low resistance coil complete, and in addition portions of other coils embedded in one of the grooves. Each lamella has two wire ends embedded therein and insulated therefrom in the manner described with reference to Figs. 18 to 24, which wire ends carry terminals 102 and 102' adapted to be connected with the lamellæ by contact plates 114.

In Fig. 29 the said contact plates 114 connect the right hand terminals 102 of the low resistance windings with the lamellæ, and the current supplied to the system from the battery flows from lamella $XIX^g$, through low resistance wires $20'^g$, $3'^g$ located in the grooves $20^g$ and $3^g$, lamella $VIII^g$, cooperating contact plate 114, low resistance wires $9'^g$, $15'^g$ embedded respectively in the grooves $9^g$ and $15^g$, lamella $XX^g$, etc. When shifting the contact plates to the left, the high resistance winding is thrown into operation, the current flowing from lamella $XIX^g$ over cooperating contact plate 114, high resistance wire 18″ˢ embedded in grove 18ˢ, wire 1″ˢ embedded in groove 1ˢ, lamella VIIIˢ, cooperating contact plate 114, wire 7″ˢ embedded in groove 7ˢ, wire 13″ˢ embedded in groove 13ˢ, lamella XXˢ, etc. The figure shows that corresponding high and low resistance wires connected to the same lamellæ such for example as 15′ˢ and 13″ˢ connected to lamella XXˢ or 9′ˢ and 7″ˢ connected to lamella VIIIˢ are embedded in grooves which are displaced with relation to each other, which displacement corresponds to the angle included between the neutral zones, as has been described with reference to Figs. 26 and 27.

While in describing the invention reference has been made to various examples embodying the same we wish it to be understood that our invention is not limited to the constructions shown in the drawings, and that various changes may be made in the general arrangement of the systems and the construction of the armature and its parts without departing from our invention.

We claim:

1. In an electric starter for prime movers, the combination, with an armature, and the winding thereof made in sections, of a commutator, and means to connect the sections of the armature winding to the lamellæ of the commutator selectively for producing high or low armature resistances.

2. In an electric starter for prime movers, the combination, with an armature, and the winding thereof made in sections respectively of high and low resistance, of a commutator, and means to connect the sections of the armature winding to the lamellæ of the commutator selectively for producing high or low armature resistances.

3. In an electric starter for prime movers, the combination, with an armature, and the winding thereof made in sections respectively of high and low resistance, of a commutator, and means to connect either the sections of high or low resistance in circuit with the lamellæ of the commutator.

4. In an electric starter for prime movers, the combination with an armature, and the winding thereof made in sections, of a commutator, and means automatically controlled as the armature shaft is rotated at one time electrically and at another time by the prime mover to connect the sections of the armature winding to the lamellæ of the commutator selectively for producing high or low armature resistances.

5. In an electric starter for prime movers, the combination, with an armature, and the winding thereof made in sections, of a commutator, means to connect the sections of the armature winding to the lamellæ of the commutator selectively for producing high or low armature resistances, and an armature shaft made in two sections one carrying the armature and commutator and the other one said connecting means and adapted for connection with said prime mover, said shaft sections being movable relatively to each other for operating said connecting means.

6. In an electric starter for prime movers, the combination, with an armature, and the winding thereof made in sections, of a commutator, the lamellæ of the commutator being adapted to be connected each with two of said sectional windings and means to connect the lamellæ each to either one of said sectional coils.

7. In an electric starter for prime movers, the combination, with an armature, and the winding thereof made in sections, of a commutator, the lamellæ of the commutator each having one of the ends of two sections of the armature winding embedded therein and insulated therefrom, and means to connect the lamella with either one of the ends of the sections embedded therein.

8. In an electric starter for prime movers, the combination, with an armature, and the winding thereof made in sections, of a commutator, the lamellæ of the commutator each having one of the ends of two sections of the armature winding embedded therein and insulated therefrom, and means automatically controlled as the armature shaft is rotated at one time electrically and at another time by the prime mover to connect the lamella with either one of the ends of the sections embedded therein.

9. In an electric starter for prime movers, the combination, with an armature, and the winding thereof made in sections of different resistances, of a commutator, the lamellæ of the commutator each having one of the ends of two sections of different resistances of the armature winding embedded therein and insulated therefrom, and means to connect the lamella with either one of the ends of the sections embedded therein.

10. In an electric starter for prime movers, the combination with an armature whose windings comprise sections of different resistance, a commutator, and shiftable connections between armature windings and commutator lamellæ, comprising a series of contacts borne on a rotatable carrier.

11. In an electric starter for prime movers, the combination with an armature whose windings comprise sections of different resistance, a commutator, an annular carrier rotatable within a demarcated range relatively to said commutator, a series of insulated contacts borne by said carrier and adapted in the range of the relative rotation indicated to establish connection selectively through different sections of said armature windings.

12. In an electric starter for prime movers, an armature provided with a plurality of coils, a commutator, a ring carrying a plurality of contact pieces and movable relatively to said commutator, each armature coil connected at one end to a lamella of the commutator and at the other end to a contact piece engaged by a contact on said carrier.

13. In an electric starter for prime movers, an armature shaft, armature windings borne by said shaft, a commutator borne by said shaft, a ring borne on said shaft and rotatable thereon within a range defined by fixed stops, said ring being provided with contact pieces, said windings being connected at one end to the lamellæ of the commutator and at the other end to contact pieces engaged by a contact borne by said ring.

14. In an electric starter for prime movers, the combination with the shaft of the prime mover, of an armature whose shaft is arranged coaxially with the shaft of the prime mover, said armature including windings, comprising sections of different resistance, a commutator, and a ring borne by one of the aligned shafts and rotatable thereon within positively defined limits, said ring provided with contact pieces, said sections of armature winding connected at one end with lamellæ of the commutator and at the other end with contact pieces engaged by a contact borne by said ring, said ring being freely turning upon its sustaining shaft, whereby the ring will lag with respect either to the armature shaft or the prime-mover shaft, according as the armature shaft is driving or is driven by the prime-mover shaft.

15. In an electric starter for prime movers, the combination, with an armature, and the winding thereof made in sections of different resistances, of a commutator, and means to connect the sections of the armature winding to the lamellæ of the commutator selectively for producing high or low armature resistances, adjacent sections of different resistances being connected to commutator lamellæ displaced with relation to each other a distance corresponding to the angular position of the neutral zones of the system corresponding to the use of the sections of the winding.

In testimony whereof we hereunto affix our signatures in the presence of two witnesses.

ÁRPÁD BARÉNYI.
PAUL KAEMMERER.

Witnesses:
E. HOLTZERMAN,
C. LIEBE.